US012786335B2

(12) United States Patent
Otagiri

(10) Patent No.: US 12,786,335 B2
(45) Date of Patent: Nov. 3, 2026

(54) READING DEVICE AND IMAGE FORMING APPARATUS

(71) Applicant: FUJIFILM Business Innovation Corp., Tokyo (JP)

(72) Inventor: Kei Otagiri, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/163,080

(22) Filed: Feb. 1, 2023

(65) Prior Publication Data

US 2024/0106956 A1 Mar. 28, 2024

(30) Foreign Application Priority Data

Sep. 27, 2022 (JP) ................................ 2022-154053

(51) Int. Cl.
*H04N 1/10* (2006.01)
*H04N 1/00* (2006.01)

(52) U.S. Cl.
CPC ....... *H04N 1/1061* (2013.01); *H04N 1/00816* (2013.01); *H04N 1/1035* (2013.01)

(58) Field of Classification Search
None
See application file for complete search history.

(56) References Cited

U.S. PATENT DOCUMENTS 10,880,446 B2 12/2020 Watanabe
2011/0181923 A1* 7/2011 Wang .................. H04N 1/0285 358/475
2012/0086991 A1* 4/2012 Hara .................... H04N 1/1039 358/497
2020/0304665 A1* 9/2020 Watanabe ............ H04N 1/1061
2021/0289096 A1 9/2021 Maeda et al.

FOREIGN PATENT DOCUMENTS

JP 2001-083628 A 3/2001
JP 2005-203987 A 7/2005
JP 2012-108374 A 6/2012
JP 2020-155845 A 9/2020
JP 2021-145262 A 9/2021

OTHER PUBLICATIONS

Aug. 18, 2026 Office Action issued in Japanese Patent Application No. 2022-154053.

* cited by examiner

*Primary Examiner* — Darryl V Dottin
(74) *Attorney, Agent, or Firm* — Oliff PLC

(57) ABSTRACT

A reading device includes: a housing including a transparent flat plate on an upper surface on which an object to be read is placed; a reading unit that reads information on the object to be read by coming into contact with a lower surface of the transparent flat plate inside the housing; a movement unit that causes the reading unit to move back and forth within a scan area inside the housing; and a motor that provides power to the movement unit inside the housing. The motor is disposed to overlap with the reading unit along upward and downward directions inside the housing.

13 Claims, 10 Drawing Sheets

READING DEVICE AND IMAGE FORMING APPARATUS

CROSS-REFERENCE TO RELATED APPLICATIONS

This application is based on and claims priority under 35 USC 119 from Japanese Patent Application No. 2022-154053 filed Sep. 27, 2022.

BACKGROUND

(i) Technical Field

The present disclosure relates to a reading device and an image forming apparatus.

(ii) Related Art

Japanese Unexamined Patent Application Publication No. 2021-145262 (claim 1, FIG. 2) describes a receiving device including: multiple light blockers extending in one direction, the multiple light blockers having multiple cylindrical light-passing through-holes extending in a cross direction crossing the one direction, wherein the multiple light blockers are arranged in the one direction so that ends of adjacent light blockers are disposed in a light blocking direction; a light blocking member including a fixing member that fixes the multiple light blockers to a housing in which an opening is formed, opened in the cross direction, the multiple light blockers with the opening and the through-holes opposed in the cross direction; an optical member in which multiple lenses are formed which receive incident light passing through the through-holes of the light blocking member; and a substrate including an element that receives light which has passed through the lenses of the optical member.

Japanese Unexamined Patent Application Publication No. 2020-155845 (claim 1, FIG. 2, FIG. 5) describes an image reading device including: an image reading unit that moves in a sub-scanning direction to read an image; a storage that stores the image reading unit; a support provided in the lower surface of the storage unit, the support having inclined surfaces formed in a symmetrical Japanese katakana character "HA" shape spreading laterally in both right and left in a direction crossing the sub-scanning direction; and a guide unit provided to come into contact with the support and extend in the sub-scanning direction, the guide unit being configured to movably guide the support relatively to the guide unit.

SUMMARY

Aspects of non-limiting embodiments of the present disclosure relate to a reading device in which the height of a housing for the reading device is reduced, as compared to when a motor is disposed inside the housing so as not to overlap with a reading unit along upward and downward directions.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a reading device including: a housing including a transparent flat plate on an upper surface on which an object to be read is placed; a reading unit that reads information on the object to be read by coming into contact with a lower surface of the transparent flat plate inside the housing; a movement unit that causes the reading unit to move back and forth within a scan area inside the housing; and a motor that provides power to the movement unit inside the housing, wherein the motor is disposed to overlap with the reading unit along upward and downward directions inside the housing.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment for implementing the present disclosure will be described.

Exemplary Embodiment 1

Figure 1:
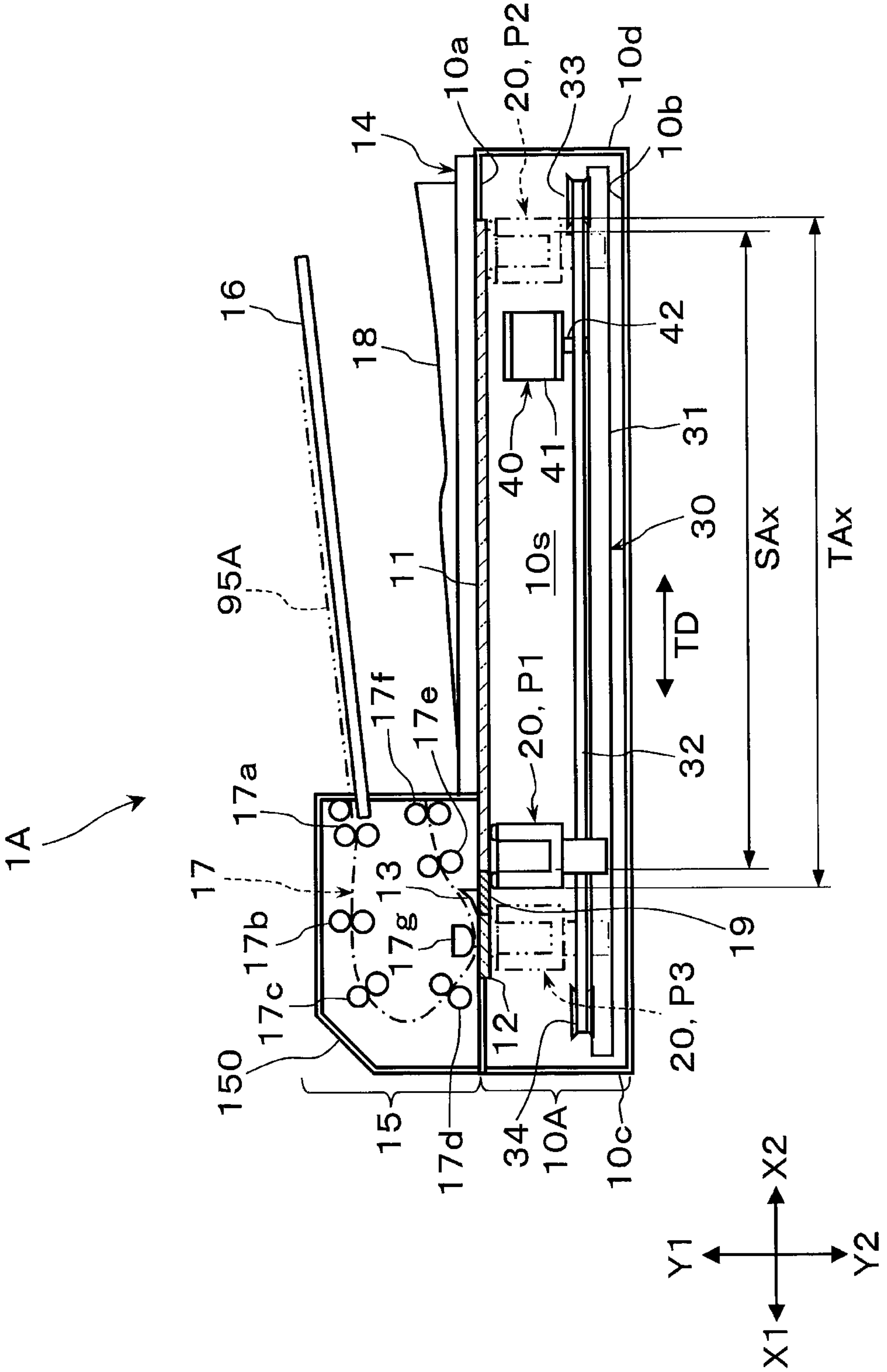
FIG. 1 is a schematic view of a reading device according to Exemplary Embodiment 1.
Figure 2:
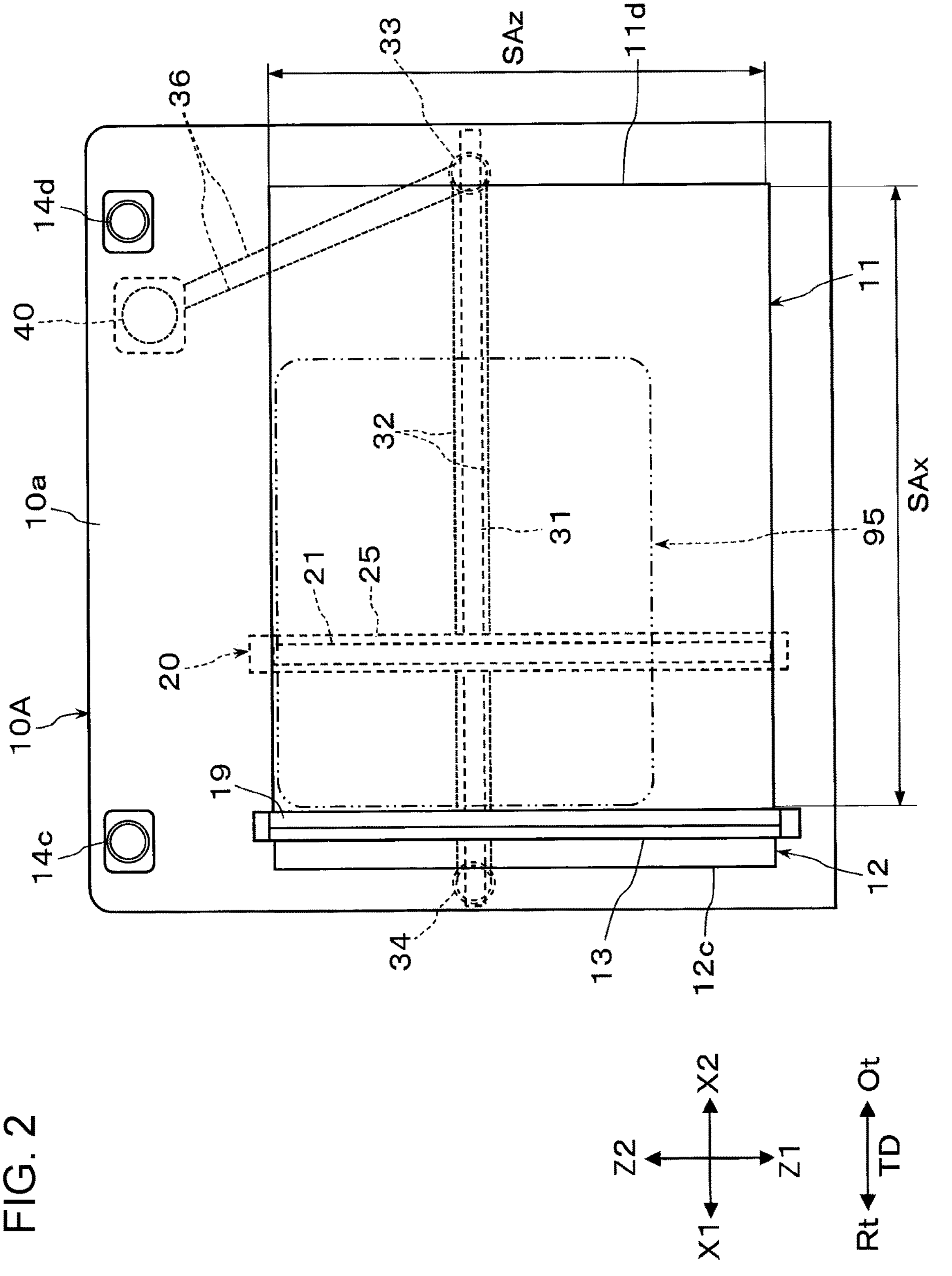
FIG. 2 is a schematic top view of the reading device of FIG. 1.

FIG. 1 is a schematic cross-sectional view of a reading device 1 according to Exemplary Embodiment 1 of the present disclosure. FIG. 2 is a schematic top view of a reading device 1A of FIG. 1 with an opening and closing cover removed.

Essentially the same components in the present specification and the drawings are labeled with the same symbol, and a redundant description of those components is omitted in the present specification.

As illustrated in FIG. 1 and FIG. 2, the reading device 1A includes: a housing 10A including a first transparent flat plate 11 at an upper portion, the first transparent flat plate 11 being an example of a transparent flat plate on which an object to be read 95 is placed; a reading unit 20 that reads information on the object to be read 95 by coming into contact with a lower surface 11*b* of the first transparent flat plate 11; a movement unit 30 that causes the reading unit 20 to move back and forth within a scan area SA; and a motor 40 that provides power to the movement unit 30.

It is sufficient that the object to be read 95 be an object which can be placed on an upper surface 11*a* of the first transparent flat plate 11, and can be read by the reading unit 20. As the object to be read 95, for example, a sheet-like document 95A, and a book may be mentioned.

Figure 5:
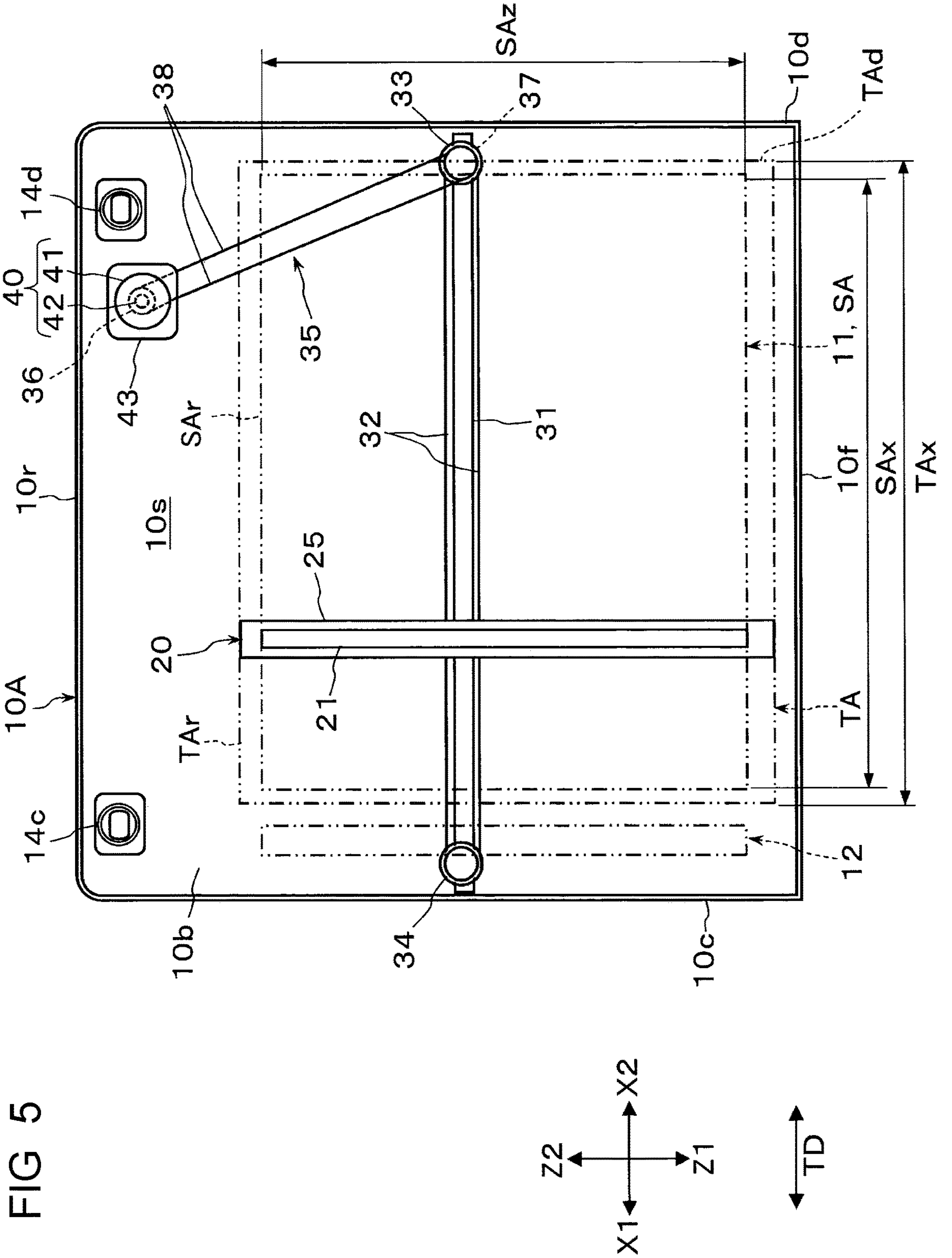
FIG. 5 is a schematic top view of the reading device of FIG. 1 with an opening and closing cover removed.

The housing 10A is a structural body having a substantially box shape, and internally has a storage space 10*s*. As illustrated in FIG. 1, FIG. 5 in a distributed manner, the storage space 10*s* is the space surrounded by an upper surface portion 10*a*, a bottom surface portion 10*b*, a left-side surface portion 10*c*, a right-side surface portion 10*d*, a front wall surface portion 10*f* and a rear wall surface portion 10*r*.

In the housing 10A, the first transparent flat plate 11 comprised of a clear glass plate for placing the object to be read 95 is installed in an opening provided in part of the upper surface portion 10*a*. The flat plate is a plate where its upper and lower surfaces are smooth and parallel to each other.

The first transparent flat plate 11 is used in a fixed document reading mode in which the object to be read 95 as a document is read in a fixed state. Such first transparent flat plate 11 may be referred to as a platen glass.

In the first transparent flat plate 11, its planar part has a rectangular shape consisting of a horizontal dimension SAx along the left and right directions X1, X2 (also corresponding to the width direction) of the reading device 1A, and a depth dimension SAz (see FIG. 2.) along front and rear directions Z1, Z2 (also corresponding to the depth direction) of the reading device 1A. Furthermore, the first transparent flat plate 11 is configured so that its planar area substantially corresponds to the scan area SA in a fixed document reading mode.

Additionally, in the housing 10A, a second transparent flat plate 12 comprised of a clear glass is installed in an opening provided in another part of the upper surface portion 10*a*.

The second transparent flat plate 12 is used in a moving document reading mode in which a sheet-like document 95A as an example of the object to be read 95 is read in a moving state.

In the second transparent flat plate 12, its planar part has an elongated rectangular shape consisting of a horizontal short dimension SAx along the left and right directions X1, X2 of the reading device 1A, and a depth dimension SAz along the front and rear directions Z1, Z2 of the reading device 1A.

Furthermore, in the housing 10A, the upper surface portion 10*a* is provided with an opening and closing cover 14 that covers the first transparent flat plate 11 and the second transparent flat plate 12.

As illustrated in FIG. 1, the opening and closing cover 14 in Exemplary Embodiment 1 is formed as an openable and closable cover provided with an automatic document transport device 15 that automatically transports and passes the sheet-like document 95A, which is an example of the object to be read 95, through the second transparent flat plate 12.

Symbols 14*c*, 14*d* in FIG. 2 and other figures indicate hinge mounting sections for mounting hinges (not illustrated) disposed rearward of the opening and closing cover 14.

As illustrated in FIG. 1, the automatic document transport device 15 includes: a device body 150 having a document transport path 17 for transporting the sheet-like document 95A along a needed path; a document placing tray 16 on which sheet-like documents 95A are placed in a stacking manner; and a document storage section 18 into which the documents 95A after being read are discharged and stored.

The device body 150 is a structural body having an exterior member provided with a document inlet port and a document discharge port (not illustrated), and a storage space inside the exterior member. The device body 150 is disposed near at one (the left-side end in this example) of the ends of the reading device 1A in the left and right directions X1, X2 when viewed from the front side of the reading device 1A.

The document transport path 17 transports the sheet-like document 95A placed on the document placing tray 16 so that the document 95A comes into contact with and passes through at least the upper surface of the second transparent flat plate 12, and is finally discharged to the document storage section 18.

The document transport path 17 is formed by disposing, at needed positions, multiple transport roller pairs 17*a*, 17*b*, 17*c*, 17*d*, 17*e*, 17*f*, a transport guide member (not illustrated), and a drive device (not illustrated) that provides power to rotate the transport roller pairs 17*a*, 17*b*, 17*c*, 17*d*, 17*e*, 17*f* in and at needed direction and speed.

A symbol 17*g* in FIG. 1 indicates a proximity guidance member that guides the sheet-like document 95A so that the document 95A approaches and passes through the upper surface of the second transparent flat plate 12.

A symbol 13 in FIG. 1 and FIG. 2 indicates a separation guidance member that guides the document 95A after passing the second transparent flat plate 12 so that the document 95A is separated from the second transparent flat plate 12. The separation guidance member 13 is disposed at the boundary between the first transparent flat plate 11 and the second transparent flat plate 12 of the upper surface portion 10*a* of the housing 10A.

Furthermore, a symbol 19 in FIG. 1 and FIG. 2 indicates a flat plate-like plate member disposed between the first transparent flat plate 11 and the second transparent flat plate 12. The lower surface of the plate member 19, facing the storage space 10*s* for the housing 10A is colored white.

The document placing tray 16 is provided as a plate-shaped tray which is present above the opening and closing cover 14, over the space where the device body 150 is not present so as to project from one side of the device body 150 in a slightly inclined manner.

The document storage section 18 is provided as a base section composed of, for example, a wave-like storage curved surface on the upper surface portion of the opening and closing cover 14, where the device body 150 is not present.

The reading unit 20 is a unit that is disposed inside the housing 10A, and receives reflected light obtained when the object to be read 95 is illuminated, then converts the reflected light to an electrical signal. The reading unit 20 in Exemplary Embodiment 1 is comprised of an instrument using the contact image sensor (CIS) method.

Figure 3A:
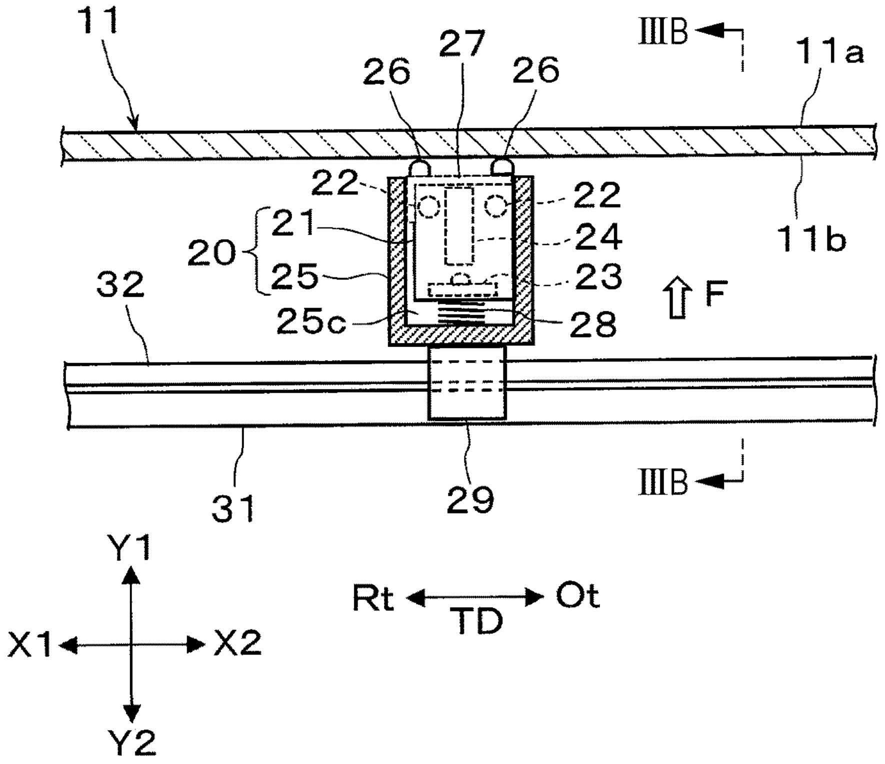
FIG. 3A is an enlarged schematic view of part of the reading device of FIG. 1.
Figure 3B:
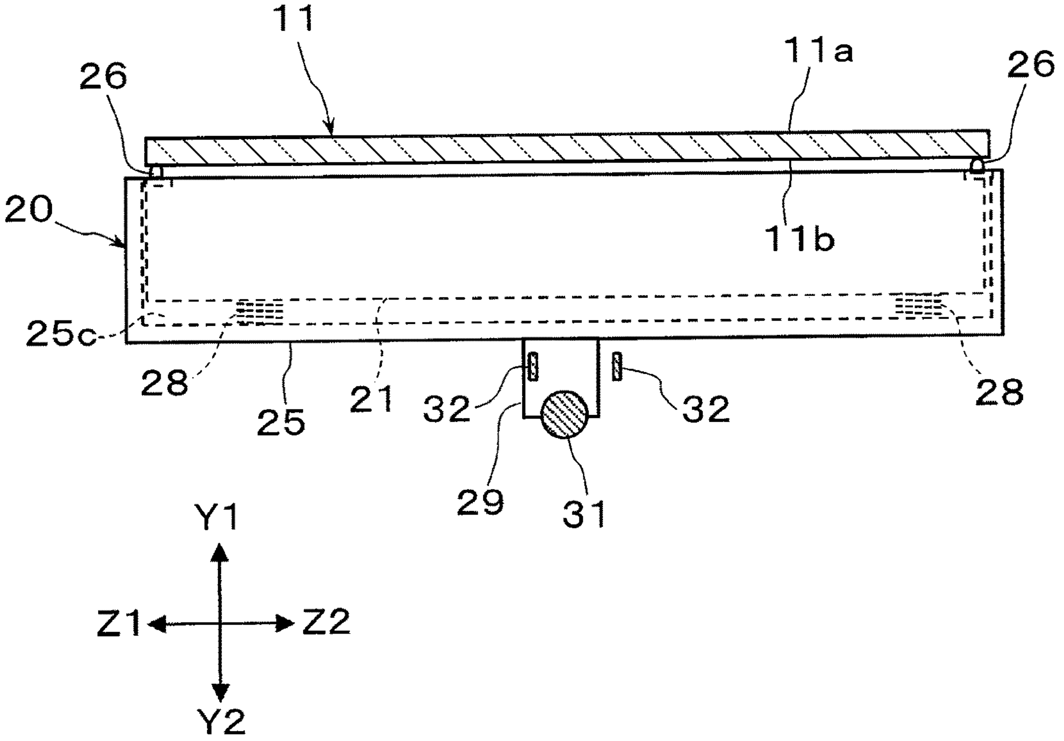
FIG. 3B is a schematic cross-sectional view taken along line IIIB-IIIB of FIG. 3A.

As illustrated in FIGS. 3A and 3B, the reading unit 20 using CIS is comprised of a cuboid-shaped reading body 21 which is elongated in the front and rear directions Z1, Z2 (also corresponds to the depth direction) of the reading device 1A, and a housing body 25 to house the reading body 21.

In the reading body 21, a light emitting array 22, a light receiving substrate 23, and a condenser lens array 24 are disposed in a cuboid-shaped case (not illustrated) which is elongated in the front and rear directions Z1, Z2 of the reading device 1A and has an open upper surface.

The light emitting array 22 is an instrument that emits light to illuminate the object to be read 95 (with the first transparent flat plate 11 interposed therebetween). The light receiving substrate 23 is a substrate on which a light receiving device, and components of an electronic instrument or the like are disposed, the light receiving device being configured to receive reflected light obtained when the object to be read 95 is illuminated by the light emitting array 22 and to convert the reflected light to an electrical signal. The condenser lens array 24 is an optical component that condenses and guides reflected light obtained when the object to be read 95 is illuminated by the light emitting array 22 to the light receiving substrate 23.

The light emitting array 22 and the light receiving substrate 23 in the reading body 21 are coupled to a controller which is not illustrated.

The housing body 25 is a structural body having a storage space 25*c* into which the reading body 21 is fitted from above and stored.

The upper surface of the housing body 25 is provided with contact sections 26 that come into contact with and slide along the lower surface 11*b* of the first transparent flat plate 11.

The contact sections 26 are provided on the upper surface of a support plate 27, for example, at positions opposed to the lower surface 11*b* of the first transparent flat plate 11 and on the upper surface at both ends of the reading body 21 in the longitudinal direction (corresponds to the front and rear directions Z1, Z2 of the reading device 1A), the support plate 27 being in contact with the upper surface of the reading body 21 and the wall surface on one side of the storage space 25*c*. The contact sections 26 are formed in a shape projecting from the upper surface of the support plate 27 by a needed dimension.

In the bottom surface of the storage space 25*c* of the housing body 25, multiple urging members 28 are disposed which urge the reading body 21 stored and retained in the storage space 25*c* toward the lower surface 11*b* of the first transparent flat plate 11 with an elastic urging force F (in the upward direction Y1). A member such as a spring is used as the urging member 28, for example.

In addition, the lower surface of the housing body 25 is provided with a coupling mounting member 29 which is mounted so as to be connected to part of the movement unit 30.

As illustrated in FIG. 3B, the coupling mounting member 29 is provided in a state of being projected downward from the lower surface of the housing body 25. A lower portion of the coupling mounting member 29 has a shape for mounting to be slidably connected to the later-described guide unit 31 of the movement unit 30, while receiving and supporting the guide member 31. The coupling mounting member 29 is mounted so that part of the later-described movement member 32 of the movement unit 30 is fixed and connected to one side (for example, the front side) of an upper portion of the coupling mounting member 29.

Note that the coupling mounting member 29 may be divided into a first coupling mounting member for mounting the guide unit 31 and a second coupling mounting member for mounting part of the movement member 32.

The movement unit 30 is a unit disposed inside the housing 10A to cause the reading unit 20 to move in the direction (back-and-forth movement direction) TD in which the reading unit 20 moves back and forth.

The actual movement unit 30 in Exemplary Embodiment 1 includes the guide unit 31, the movement member 32, and rotary holders 33, 34. The movement unit 30 is disposed to be positioned below the reading unit 20 inside the housing 10A.

The guide unit 31 is a unit that supports and guides the reading unit 20 along the back-and-forth movement direction TD.

The guide unit 31 is comprised of, for example, a substantially circular rod-shaped guide bar, and is disposed along the back-and-forth movement direction TD inside the storage space 10*s* for the housing 10A.

As illustrated in FIG. 3B, the guide unit 31 is mounted to be coupled to the coupling mounting member 29 of the housing body 25 for the reading unit 20 in a state of slidably penetrating the coupling mounting member 29.

The movement member 32 is a member that is fixed to part of the reading unit 20, and arranged along the guide unit 31 to move. The movement member 32 is comprised of an endless belt or a wire, for example. As illustrated in FIG. 3B, part of the movement member 32 is mounted to be coupled to the coupling mounting member 29 in a fixed state in the housing body 25 for the reading unit 20.

The rotary holders 33, 34 rotate while movably holding the movement member 32. The rotary holders 33, 34 are comprised of two pulleys that rotatably hold an endless belt, for example, by winding it on the pulleys, the endless belt being an example of the movement member 32.

The pulleys (hereinafter may be referred to as a first pulley 33, a second pulley 34A) as an example of the rotary holders 33, 34 are rotatably disposed at positions in the vicinities substantially corresponding to both ends of the guide unit 31 in the longitudinal direction.

More specifically, the first pulley 33 is disposed at a position outward (further rightward) of a right-side end 11*d* of the first transparent flat plate 11 in the left and right directions X1, X2 in a state of overlapping with the right-side end 11*d* when viewed from above. In addition, the second pulley 34A is disposed at a position outward (further leftward) of a left-side end 12*c* of the second transparent flat plate 12 in the left and right directions X1, X2 in a state of overlapping with the left-side end 12*c* when viewed from above.

When the fixed document reading mode is selected, as illustrated in FIG. 1, the movement unit 30 causes the reading unit 20 to make a back-and-forth movement between a home position (P1) substantially corresponding to a left-side end 11*c* of the first transparent flat plate 11 in the left and right directions X1, X2 and a turn back stop position (P2) substantially corresponding to the right-side end 11*d* of the first transparent flat plate 11.

When the moving document reading mode is selected, as illustrated in FIG. 1, the movement unit 30 causes the reading unit 20 to move to a reading stop position (P3) almost immediately below the second transparent flat plate 12 and maintains the reading unit 20 at a stopped state.

The motor 40 is an electric motor that provides power to the movement unit 30.

As illustrated in FIG. 1, the motor 40 includes a motor body 41, and a drive shaft 42. The motor body 41 is a body in which components to cause the drive shaft 42 to rotate are internally stored. The drive shaft 42 is a shaft that outputs rotational power in a state of projecting from one end of the motor body 41.

The motor 40 is designed to transmit rotational power to one rotary holder 33 (for example, the first pulley 33) between the rotary holders 33, 34 in the movement unit 30 while switching between normal and reverse directions, and finally to rotate and move the movement member 32 in a needed direction between the rotary holders 33, 34. In other words, the motor 40 provides the power for moving the movement member 32 so that the reading unit 20 is moved in the back-and-forth movement direction TD by a predetermined distance between the rotary holders 33, 34.

Also, when the reading device 1A is used as an independent reading device by being connected to an information terminal, necessary component devices such as a power supply device, an operation section, and a controller which are not illustrated are disposed inside or outside the housing 10A.

The operation section is a section in which operation components, such as a power switch, operation selection buttons, a start button, and a stop button are disposed. The operation section may include a display, such as a liquid crystal panel, on which information such as operation contents is displayed. The controller controls the operation of the reading unit 20, a drive device such as the motor 40, and a power supply device.

*Operation of Reading Device

The reading device 1A is capable of reading in the fixed document reading mode and reading in the moving document reading mode.

When the fixed document reading mode is selected, the reading device 1A operates in the following manner.

In this case, the reading device 1A is first set in a state where the opening and closing cover 14 is opened, and a needed object to be read 95 is placed on the upper surface 11*a* of the first transparent flat plate 11, and finally, the reading device 1A is set in a state where the opening and closing cover 14 is closed.

Subsequently, in the reading device 1A, upon receiving a start command for a read operation from an operation section which is not illustrated, the motor 40 is started to operate the movement unit 30.

Thus, after receiving detected information indicating that the object to be read 95 is placed on the upper surface 11*a* of the first transparent flat plate 11, the reading unit 20 moves from the home position almost immediately below the plate member 19 to the read start position P1 almost immediately below the left-side end 11*c* of the first transparent flat plate 11.

Thereafter, the reading unit 20 is moved immediately under the first transparent flat plate 11 from the read start position P1 in the outward direction Ot in the back-and-forth movement direction TD at a needed speed. At this point, the reading unit 20 is moved to the turn back stop position P2 almost immediately below the right-side end 11*d* of the first transparent flat plate 11, and stopped.

In the reading device 1A, when the reading unit 20 is moved in the outward direction Ot, information on the object to be read 95 is read by the reading unit 20. The information on the object to be read 95 is information which can be read by the reading unit 20, and is used as a piece of information on image, for example.

Finally, in the reading device 1A, the reading unit 20 is moved via the movement unit 30 by reverse drive of the motor 40 from the turn back stop position P2 in the return direction Rt in the back-and-forth movement direction TD at a needed speed, and is returned to the read start position P1, then is moved to the home position and stopped.

In the reading device 1A, reading is performed in the above manner with the object to be read 95 as a document fixed.

Next, when the moving document reading mode is selected, the reading device 1A operates in the following manner.

In this case, the reading device 1A is first set in a state where the opening and closing cover 14 is closed, and the sheet-like document 95A is placed on the document placing tray 16 of the automatic document transport device 15.

Subsequently, in the reading device 1A, upon receiving a start command for a read operation from an operation section which is not illustrated, the motor 40 is started to operate the movement unit 30. Thus, after receiving detected information indicating that the sheet-like object to be read 95A is placed on the document placing tray 16, the reading unit 20 is moved from the home position to the reading stop position P3 almost immediately below the second transparent flat plate 12, and is stopped.

Subsequently, in the reading device 1A, the automatic document transport device 15 starts, and thus the sheet-like document 95A on the document placing tray 16 is transported through the document transport path 17 and passed through the second transparent flat plate 12.

In the reading device 1A, information on the sheet-like document 95A, which is moved to pass through the second transparent flat plate 12, is read by the reading unit 20 stopped at the reading stop position P3. The read sheet-like document 95A is discharged to and stored in the document storage section 18 of the automatic document transport device 15.

Finally, in the reading device 1A, the reading unit 20 is returned via the movement unit 30 by the re-drive of the motor 40 to the home position from the reading stop position P3, and is stopped at the home position.

In the reading device 1A, reading is performed in the above manner with a document moving.

*Arrangement of Motor

Figure 4:
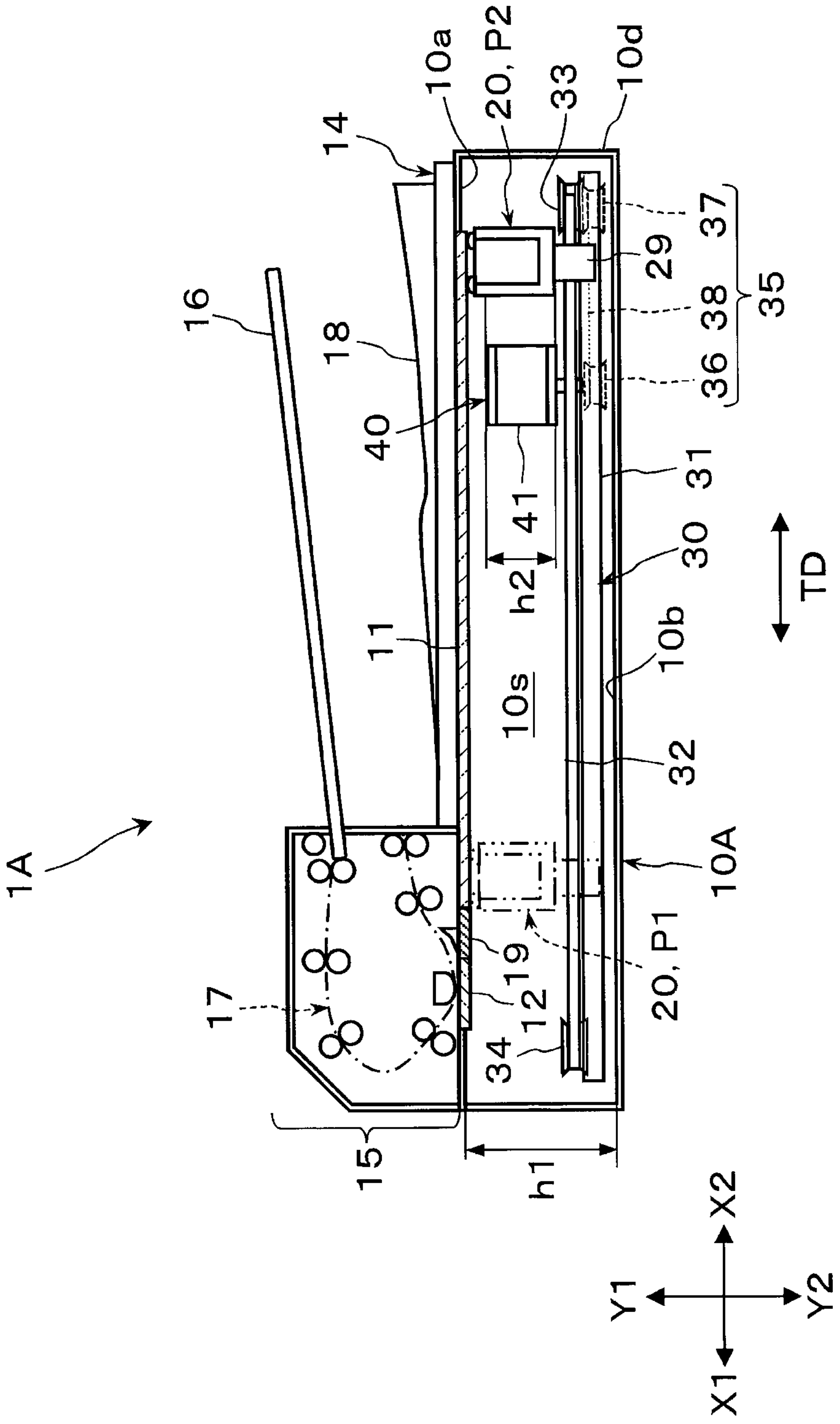
FIG. 4 is a schematic view illustrating an arrangement state of a motor and other components in the reading device of FIG. 1.

As illustrated in FIG. 4, in the reading device 1A, the motor 40 is disposed in a state of overlapping with the reading unit 20 along the upward and downward directions Y1, Y2 inside the housing 10A.

The motor 40 in Exemplary Embodiment 1 is disposed in a state where the entirety of the motor body 41 along the upward and downward directions Y1, Y2 overlaps with the housing body 25 (excluding the coupling mounting member 29) for the reading unit 20 along a height h2.

Incidentally, when the entirety of the motor body 41 is disposed to overlap with the housing body 25 for the reading unit 20, the height h2 substantially corresponds to the height of the motor body 41.

In addition, the motor body 41 of the motor 40 has no portion which is located above the upper end of the housing body 25 for the reading unit 20, and its entirety is disposed to be located below the upper end of the housing body 25. Thus, the motor body 41 is within a range of the height of the housing body 25 for the reading unit 20 along the upward and downward directions Y1, Y2.

In other words, as illustrated in FIG. 4, when the movement unit 30, specifically, the movement member 32 is regarded as a border inside the housing 10A, the motor 40 and the reading unit 20 are present in the same area with respect to the border along the upward and downward directions Y1, Y2. The area where the reading unit 20 is present is a space area above the movement member 32 of the movement unit 30 along the upward and downward directions Y1, Y2 in the storage space 10*s* for the housing 10A.

Figure 10:
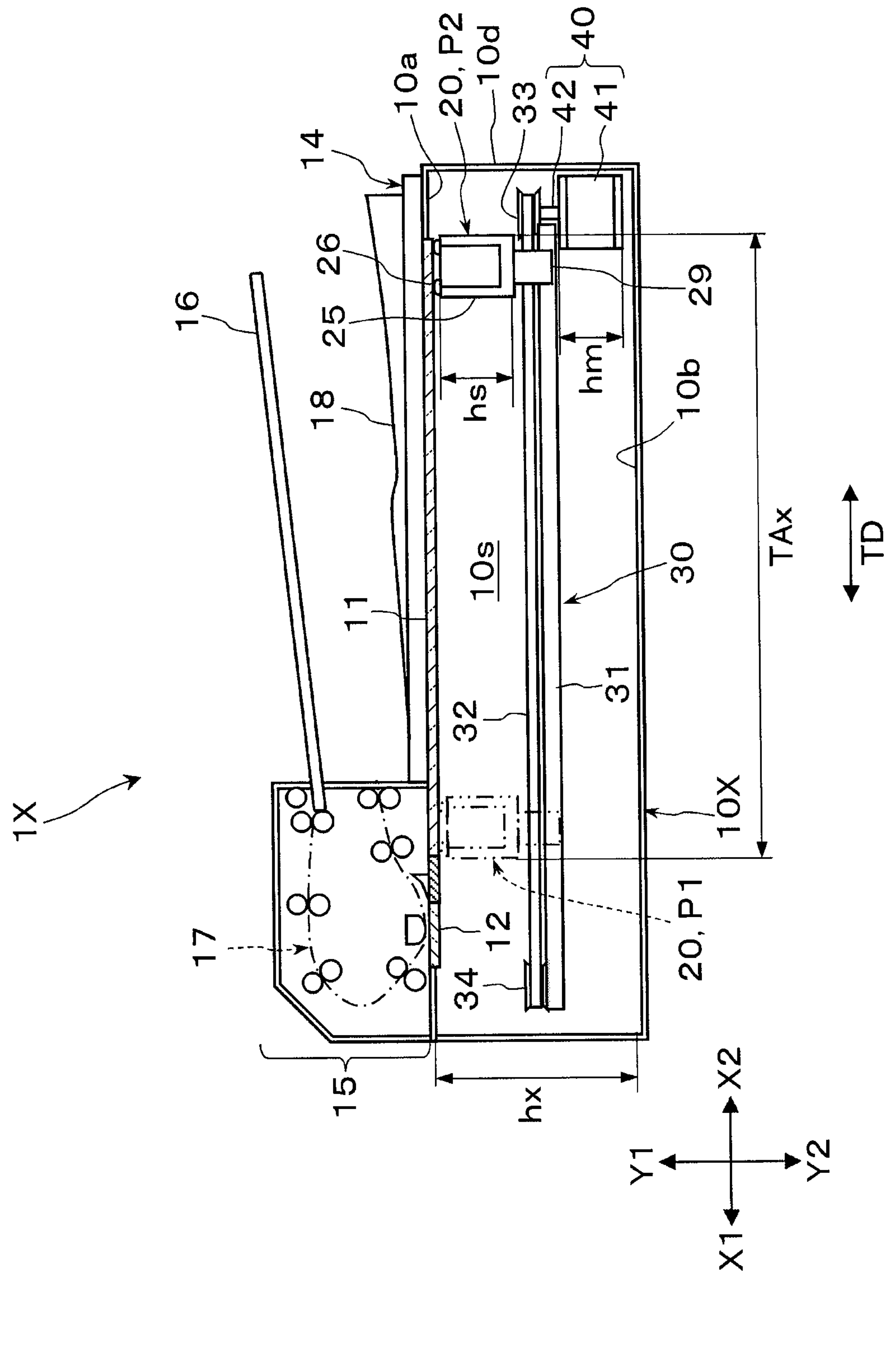
FIG. 10 is a schematic view of a reading device in a comparative example.

Therefore, as illustrated in FIG. 10, in the reading device 1A, the height h1 of the housing 10A can be reduced, as compared to (the height hx of a housing 10X of) a reading device 1X in a comparative example in which the motor 40 is disposed so as not to overlap with the reading unit 20 along the upward and downward directions Y1, Y2 inside the housing 10X.

The height h1 of the housing 10A is the internal height of the storage space 10*s* for the housing 10A, however, may be the height difference between an upper surface portion 10*a* and a bottom surface 10*b* of the housing 10A.

Also, in the reading device 1X in the comparative example, the motor 40 is disposed below the first pulley 33 in the movement unit 30. In other words, when the movement unit 30, specifically, the movement member 32 is regarded as a border inside the housing 10A, the motor 40 is present in a (different) area opposite to the area where the reading unit 20 is present with respect to the border along the upward and downward directions Y1, Y2. Also, in the reading device 1X, the drive shaft 42 of the motor 40 is directly connected (directly attached) to the first pulley 33.

Based on the above, in the reading device 1X of the comparative example, the height hx of the housing 10X is increased by the dimension equivalent to the addition of the height hm of the motor body 41 of the motor 40, as compared to (the height h1 of the housing 10A of) the reading device 1A according to Exemplary Embodiment 1.

In this respect, in the reading device 1A according to Exemplary Embodiment 1, the height h1 of the housing 10A can be reduced from the height hx of the housing 10X in the reading device 1X of the comparative example by the dimension approximately corresponding to the height hm of the motor body 41.

A symbol hs in FIG. 10 indicates the height of the housing body 25 (excluding the coupling mounting member 29 and the contact sections 26) for reading unit 20.

In addition, in the reading device 1A, as illustrated in FIG. 5, the motor 40 then is disposed outward of the scan area SA of the reading unit 20 inside the housing 10A.

In Exemplary Embodiment 1, the scan area SA is set as an area which is approximately corresponding to (slightly smaller than) the extent of the surface area of the first transparent flat plate 11. Also, in Exemplary Embodiment 1, the first transparent flat plate 11 and the first pulley 33 in the movement unit 30 are disposed at a position near the right-side surface portion 10*d* of the housing 10A, thus it is difficult to dispose the motor 40 in the vicinity (for example, the space area above the first pulley 33) of the first pulley 33.

Thus, in the reading device 1A, as illustrated in FIG. 5, the motor 40 is disposed at an outer position (open space) rearward of the rear end side SAr of the scan area SA in the storage space 10*s* for the housing 10A. A symbol 43 in FIG. 5 indicates a bracket (mounting plate) to mount the motor 40 with lifted from the bottom surface 10*b* of the housing 10A by a needed height.

In the reading device 1A, as illustrated in FIG. 4 and FIG. 5, the motor 40 is provided at a position away from the first pulley 33 in the movement unit 30, thus the drive shaft 42 of the motor 40 is coupled to a power transmission unit 35 that relays and transmits power to the first pulley 33.

The power transmission unit 35 is comprised of, for example, a drive pulley 36 mounted on the drive shaft 42 of the motor 40 disposed facing downward; a third pulley 37 fixed coaxially with and provided below the first pulley 33; and an endless belt or a wire 38 wound on the drive pulley 36 and the third pulley 37. The power transmission unit 35 transmits the power of the motor 40 to the first pulley 33 through the belt or the wire 38.

Consequently, in the reading device 1A, as compared to when the motor 40 is disposed inward of the scan area SA inside the housing 10A, the motor 40 is not provided within the scan area SA, thus when the reading unit 20 makes back-and-forth movement, interference of the motor 40 with the reading unit 20 is avoided.

Furthermore, as illustrated in FIG. 5, it may be said that the motor 40 then is disposed outward of an area TA where the reading unit 20 moves back and forth inside the housing 10A.

The area TA where the reading unit 20 moves back and forth in Exemplary Embodiment 1 is set as an area corresponding to the largest rectangular planar area occupied by the housing body 25 for the reading unit 20 when the housing body 25 moves back and forth. The area TA (transverse area TAx) where the back-and-forth movement is made in Exemplary Embodiment 1 is a protruding area so that a right end side TAd of the area TA partially overlaps with the first pulley 33 disposed on the right end side.

Thus, in the reading device 1A, as illustrated in FIG. 5, the motor 40 is disposed at an outer position (open space) rearward of the rear end side TAr of the area TA where the reading unit 20 moves back and forth in the storage space 10*s* for the housing 10A.

Consequently, in the reading device 1A, as compared to when the motor 40 is disposed inward of the area TA where the reading unit 20 moves back and forth inside the housing 10A, the motor 40 is not provided within the area TA where the reading unit 20 moves back and forth, thus interference of the motor 40 with the reading unit 20 which moves back and forth is reliably avoided.

Exemplary Embodiment 2

Figure 6:
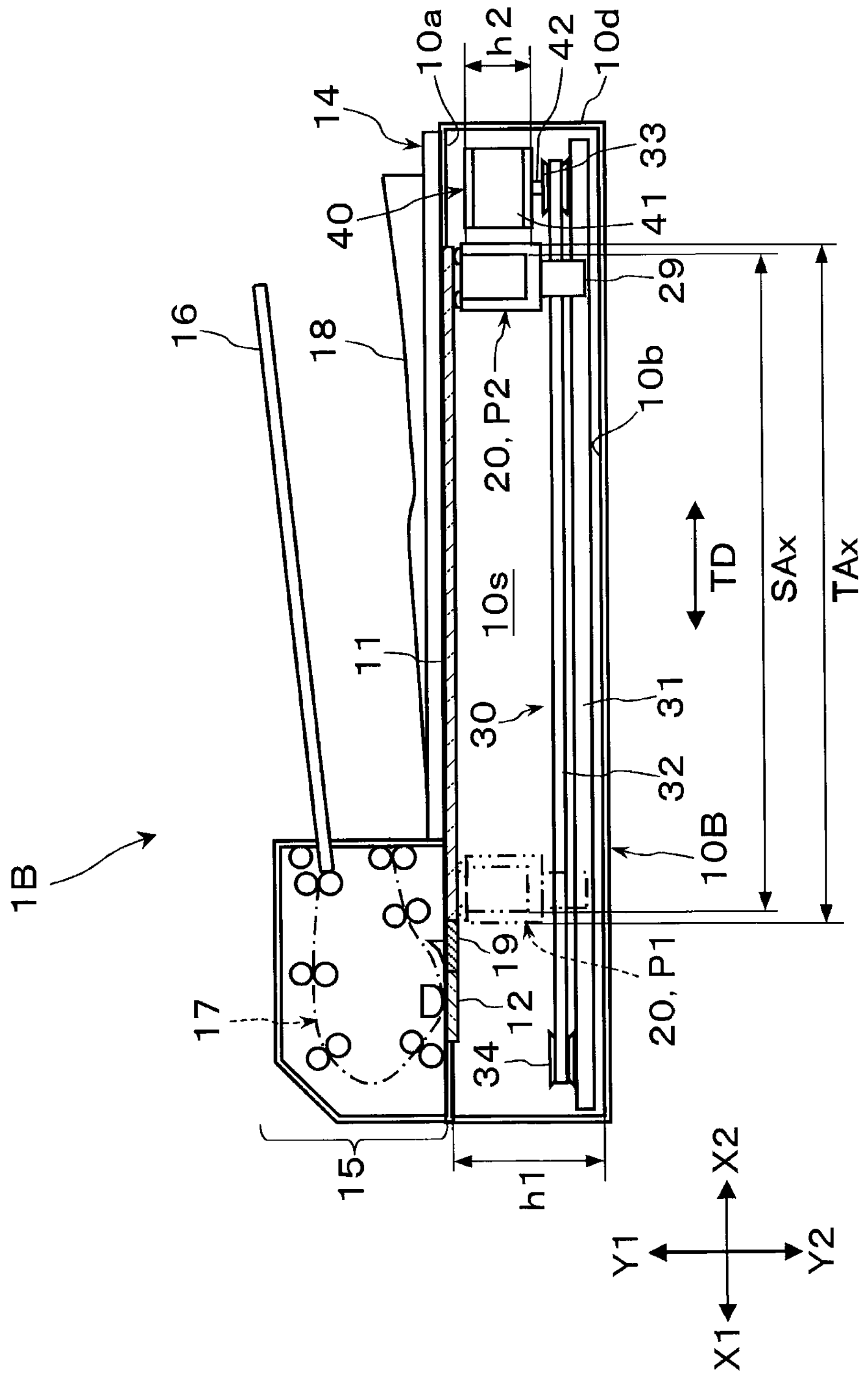
FIG. 6 is a schematic view of a reading device according to Exemplary Embodiment 2.
Figure 7:
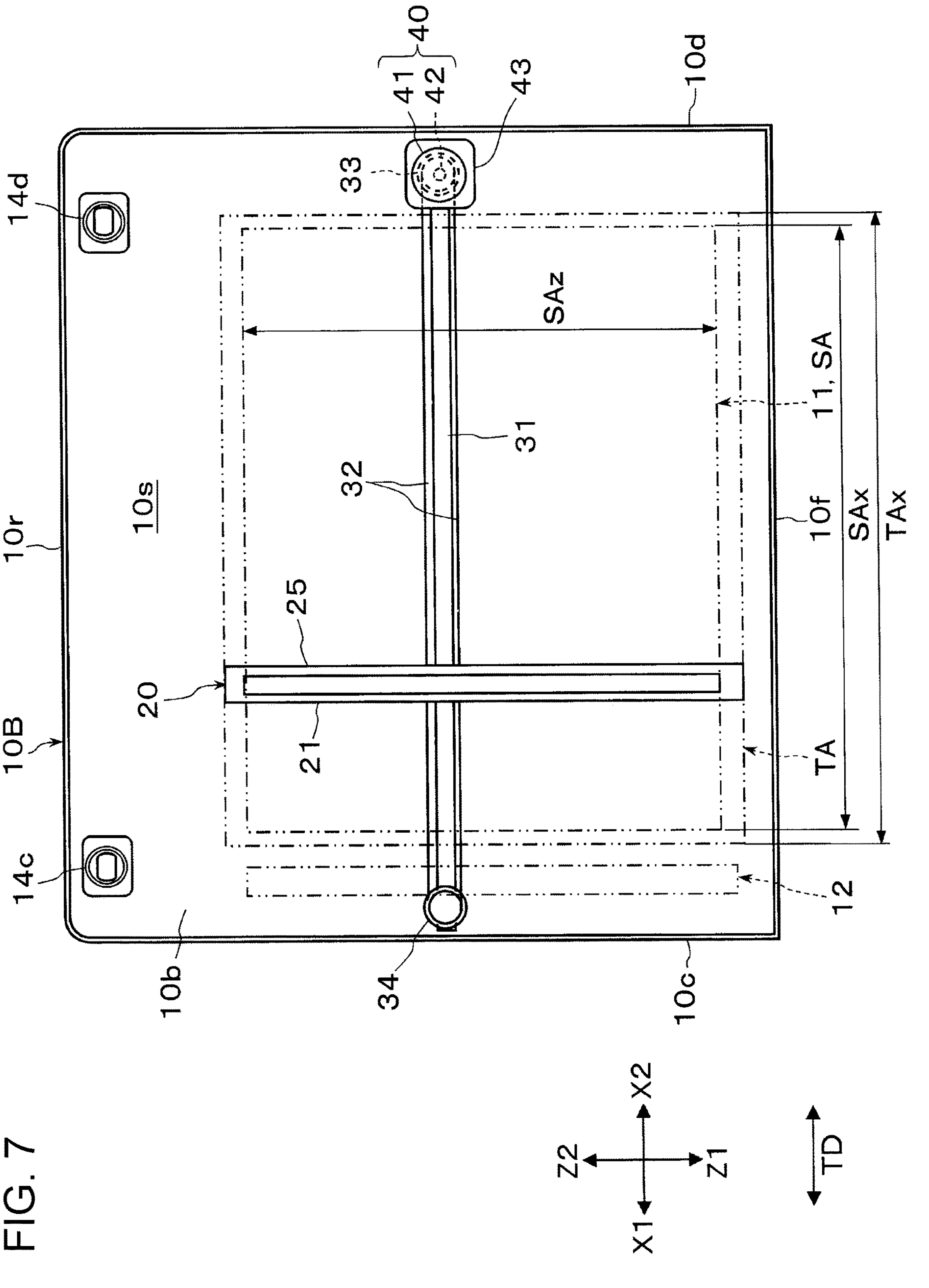
FIG. 7 is a schematic top view of the reading device of FIG. 6 with an opening and closing cover removed.

FIG. 6 is a schematic view of a reading device 1B according to Exemplary Embodiment 2, and FIG. 7 is a schematic top view of the reading device 1B with an opening and closing cover 14 removed.

The reading device 1B has the same configuration as that of the reading device 1A according to Exemplary Embodiment 1 except that partial configuration such as arrangement of the motor 40 is changed.

In the reading device 1B, it is possible to secure the space to dispose the motor 40 in an upper space area which is above the first pulley 33 in the movement unit 30 and surrounded by the reading unit 20 which has moved to the turn back stop position P2, the right-side surface portion 10*d*, and the upper surface portion 10*a* of the housing 10B. For example, a case can be cited in which the dimension of the housing 10B in the left and right directions X1, X2 is increased more than the dimension of the housing 10A in Exemplary Embodiment 1.

Thus, in the reading device 1B, the motor 40 is disposed in the upper space area, and the drive shaft 42 is directly connected (directly attached) to the first pulley 33 of the movement unit 30. In other words, the motor 40 is configured to directly drive to rotate the first pulley 33 of the movement unit 30.

Substantially, as in the case of the motor 40 in Exemplary Embodiment 1, the motor 40 then is disposed in a state where the entirety of the motor body 41 along the upward and downward directions Y1, Y2 overlaps with the housing body 25 (excluding the coupling mounting member 29) for the reading unit 20 along the height h2.

Substantially, as in the case of the motor 40 in Exemplary Embodiment 1, the motor body 41 of the motor 40 in Exemplary Embodiment 2 has no portion located above the upper end of the housing body 25 for the reading unit 20, and its entirety is disposed to be located below the upper end of the housing body 25. Thus, the motor body 41 is within a range of the height (hs, see FIG. 10) of the housing body 25 for the reading unit 20 along the upward and downward directions Y1, Y2.

In other words, as illustrated in FIG. 6, when the movement unit 30, specifically, the movement member 32 is regarded as a border inside the housing 10A, the motor 40 and the reading unit 20 are provided in the same area with respect to the border along the upward and downward directions Y1, Y2.

Therefore, in the reading device 1B, the height h2 of the housing 10B can be reduced, as compared to (the height hx of the housing 10X of) the reading device 1X in the comparative example illustrated in FIG. 10.

Specifically, also in the reading device 1B, the height h2 of the housing 10B can be reduced from the height hx of the housing 10X in the reading device 1X of the comparative example by the dimension approximately corresponding to the height hm of the motor body 41.

In the reading device 1B, the drive shaft 42 of the motor 40 is directly connected to the first pulley 33, thus the power transmission unit 35 (see FIG. 4) in Exemplary Embodiment 1 does not need to be disposed. Furthermore, in the reading device 1B, the power transmission unit 35 does not need to be disposed, thus the component (see FIG. 4) of the power transmission unit 35 disposed to project below the movement member 32 is not provided in the movement unit 30, and consequently, the height h2 of the housing 10B can be further reduced by the length of the non-existing component disposed to project.

Incidentally, also in the reading device 1B, as illustrated in FIG. 7, the motor 40 is disposed outward of the scan area SA of the reading unit 20 inside the housing 10B.

Also, in the reading device 1B, as illustrated in FIG. 7, it may be said that the motor 40 is disposed outward of the area TA where the reading unit 20 moves back and forth inside the housing 10B.

Exemplary Embodiment 3

Figure 8:
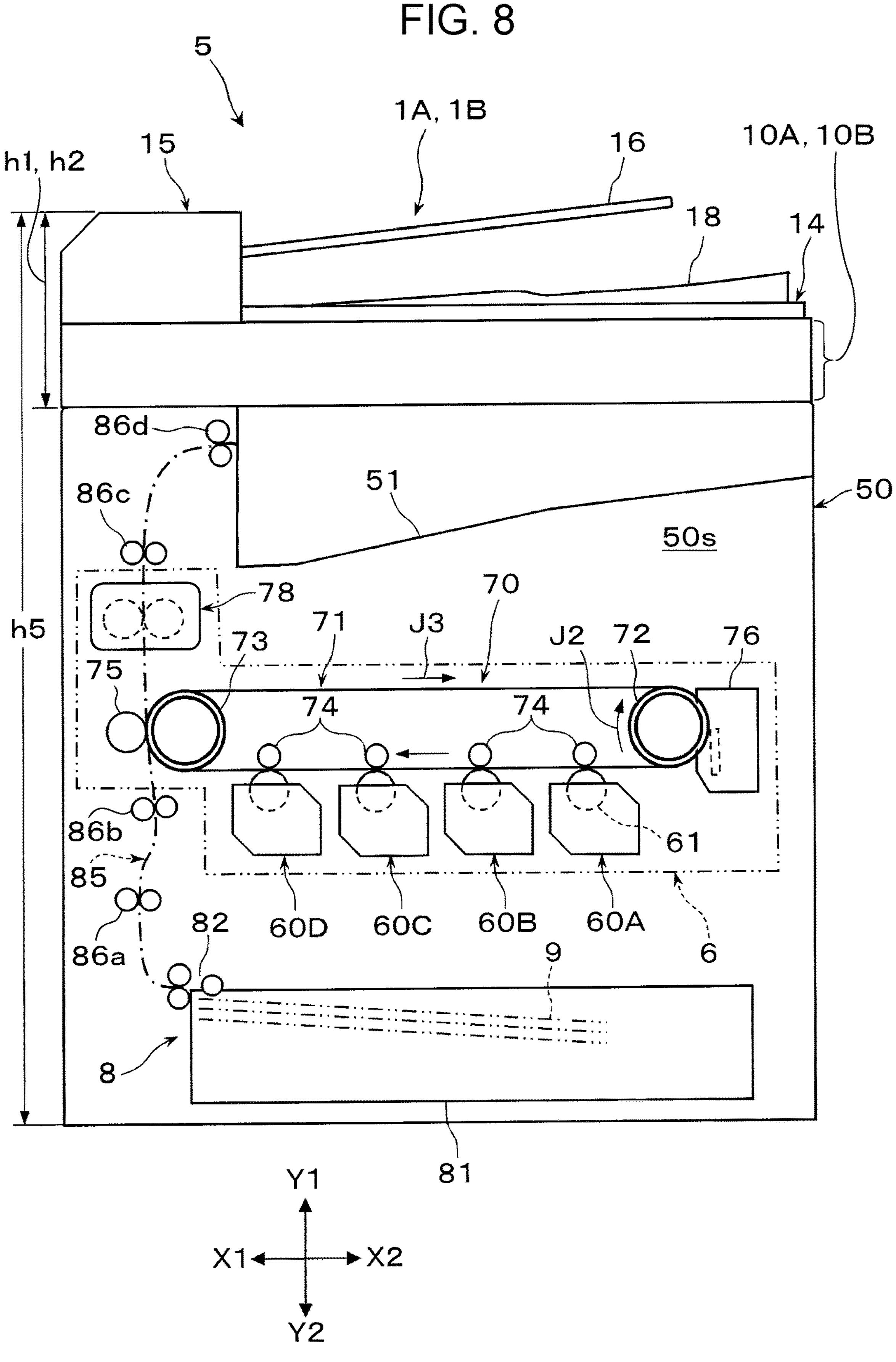
FIG. 8 is a schematic view of an image forming apparatus including a reading device according to Exemplary Embodiment 3.
Figure 9:
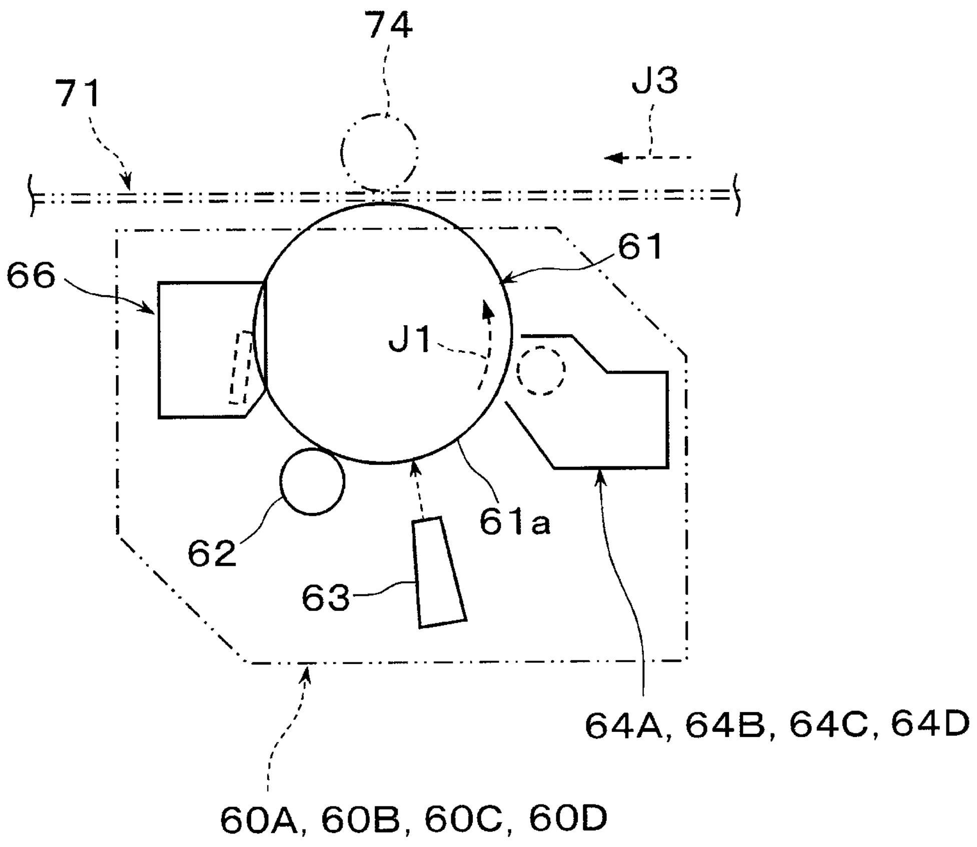
FIG. 9 is an enlarged schematic view of an imaging unit in the image forming apparatus of FIG. 8.

FIG. 8 is a schematic view of an image forming apparatus 5 including a reading device 1 according to Exemplary Embodiment 3, and FIG. 9 is an enlarged schematic view of an imaging unit 60 in the image forming apparatus 5.

As illustrated in FIG. 8, the image forming apparatus 5 includes: a housing 50; an image forming unit 6 and a medium supply unit 8 disposed inside the housing 50; and the reading device 1A or 1B as the reading device 1 disposed above the upper surface of the housing 50. In addition, the image forming apparatus 5 has functions as a copier and a printer at least.

The housing 50 is a structural body having an internal framework section and an external exterior section.

The housing 50 in Exemplary Embodiment 1 is formed as a structural body in a cuboid shape, which is slightly longer in the upward and downward directions Y1, Y2 than in the left and right directions X1, X2.

In addition, the housing 50 includes: an internal storage space 50*s* in which the image forming unit 6 and the medium supply unit 8 are stored and disposed; and a discharge storage 51 that discharges and stores a recording medium 9 on which an image is formed. The discharge storage 51 is provided, for example, in the upper surface of the housing 50 as a diagonally recessed inclined surface.

The image forming unit 6 is a component that can also form, as an image, information on the object to be read 95 read by the reading device 1A or 1B on a recording medium 9.

The image forming unit 6 in Exemplary Embodiment 3 is a unit using an electrophotographic system, and includes: the imaging unit 60 that forms a toner image composed of toner; an intermediate transfer unit 70 that relays the toner image formed by the imaging unit 60 and transfers the toner image to a recording medium 9; and a fixing device 78 that fixes the toner image transferred to the recording medium 9 thereon. The image forming unit 6 can be regarded as a unit which also includes the medium supply unit 8 that stores and supplies recording media 9.

The imaging unit 60 is comprised of four imaging units 60A, 60B, 60C, 60D that exclusively form respective color toner images composed of toner of four colors (yellow, magenta, cyan, black), for example.

The four imaging units 60A, 60B, 60C, 60D are linearly disposed in the storage space 50*s* for the housing 50.

In addition, the four imaging units 60A, 60B, 60C, 60D have substantially the same configuration except that the colors of toner to be used are the four different colors mentioned above.

Specifically, as illustrated in FIG. 9, the imaging units 60A, 60B, 60C, 60D each have a drum-shaped photoreceptor 61 which is an example of an image carrier, and devices are disposed around the photoreceptor 61, the devices including a charging device 62, a latent image forming device (image exposure device) 63, developing devices 64A, 64B, 64C, 64D, and a cleaning device 66 that cleans the image carrier surface of the photoreceptor 61.

The photoreceptor 61 is an image carrier having a photosensitive layer and an image carrier surface to carry an electrostatic latent image and a toner image, and rotates in the direction (rotation direction J1) indicated by an arrow.

The latent image forming device 63 is a device that performs exposure to form an electrostatic latent image based on image information on the image carrier surface of the photoreceptor 61 after being charged. The latent image forming device 63 operates upon receiving an image signal generated by an image processing unit (not illustrated) performing a needed process on information on an image input from the reading device 1A or 1B, or the outside.

The developing device 64A, 64B, 64C, or 64D exclusively uses toner of one color of the above-mentioned four colors. As the toner, for example, toner of a two-component developer containing toner and carrier is used.

The intermediate transfer unit 70 is configured by disposing: an endless belt-shaped intermediate transfer body 71; support rollers 72, 73 that rotatably support the intermediate transfer body 71; a first transfer roller 74; a second transfer roller 75; and a cleaning device 76 that cleans the image carrier surface of the intermediate transfer body 71.

The intermediate transfer body 71 is an endless belt having an image carrier surface that carries a toner image of each color formed by the imaging units 60A, 60B, 60C, 60D. The intermediate transfer body 71 rotates so as to circulate and move in rotation direction J3 indicated with an arrow by the support roller 72 which rotates in the direction (rotation direction J2) indicated with an arrow.

The first transfer roller 74 is a transfer device that uses a press-rotation method to press the intermediate transfer body 71 against each photoreceptor 61 for rotation at the position (first transfer position) where the intermediate transfer body 71 faces each photoreceptor 61 of the imaging units 60A, 60B, 60C, 60D. The first transfer roller 74 first transfers a toner image formed on each photoreceptor 61 onto the image carrier surface of the intermediate transfer body 71.

The second transfer roller 75 is a transfer device that uses a press-rotation method to press the intermediate transfer body 71 against the support roller 73 for rotation at the position (second transfer position) where the intermediate transfer body 71 faces the support roller 73. The second transfer roller 75 collectively transfers toner images first transferred to the intermediate transfer body 71 onto a recording medium 9.

The fixing device 78 is a device that fixes the toner images second transferred at the second transfer position of the intermediate transfer unit 70 onto a recording medium 9.

The fixing device 78 is formed by disposing devices, such as a rotating body for heating, a rotating body for pressure, in the internal space of a housing provided with an inlet port and a discharge port for the recording media 9. In the fixing device 78, a section in which the rotating body for heating and the rotating body for pressure are in pressure-contact with each other serves as a fixing nip part to perform a process of fixing.

The medium supply unit 8 is a device that stores and sends recording media 9 in a needed size to be supplied to the second transfer position of the intermediate transfer unit 70. The medium supply unit 8 is formed by disposing a medium storage 81 that stores recording media 9, and a delivery device 82 that delivers the recording media 9 in the medium storage 81 sheet by sheet.

The recording medium 9 may be a sheet-like medium which can be stored and transported, and on which a toner image can be transferred and fixed inside the housing 50. As the recording medium 9, regular paper, coated paper, thick paper, envelope may be mentioned; however, its material, and form are not particularly limited.

The dashed-dotted line indicated by a symbol 85 in FIG. 8 shows the major transport path along which the recording medium 9 is transported inside the housing 50. The transport path 85 is formed by disposing multiple transport rollers 86*a*, 86*b*, 86*c*, 86*d* that pinch and transport the recording medium 9, and multiple guide members (not illustrated) that ensure the transport space for the recording medium 9 and guide the transport of the recording medium 9.

In the image forming apparatus 5, as the reading device 1, the reading device 1A according to Exemplary Embodiment 1 or the reading device 1B according to Exemplary Embodiment 2 is used.

As illustrated in FIG. 8, the reading device 1A or the reading device 1B is mounted so that the housing 10A or the housing 10B thereof is installed to be opposed to the upper surface of the housing 50. In addition, the reading device 1A or the reading device 1B is disposed to cover the upper space of the discharge storage 51 of the housing 50. Furthermore, the reading device 1A or the reading device 1B is coupled to a power supply, an image processor, and a controller which are disposed in the housing 50 and not illustrated.

The image forming apparatus 5 can selectively perform an image forming operation as a copier to form information on the object to be read 95 read by the reading device 1A or the reading device 1B as an image copied to the recording medium 9, and an image forming operation as a printer to form information on an image input from a connected device such as an external terminal as an image recorded on the recording medium 9.

*Image Forming Operation

The image forming operation by the image forming apparatus 5 is performed in the following manner, for example.

Hereinafter the above-mentioned image forming operation as a copier will be representatively described. The image formed in the following description is a multicolor image, so-called a full-color image which is formed by combining toner of four colors: yellow, magenta, cyan and black.

First, in the image forming apparatus 5, a reading operation in the fixed document reading mode or a reading operation in the moving document reading mode is performed on needed information on the object to be read 95 in the reading device 1A or the reading device 1B.

Subsequently, when a control unit (not illustrated) receives a command for an image forming operation in the image forming apparatus 5, in the imaging units 60A, 60B, 60C, 60D and the intermediate transfer unit 70 in the image forming unit 6, a charging operation, an exposure operation, a developing operation, a transfer operation, and a cleaning operation are each performed. Meanwhile, in the image forming apparatus 5, an operation of supplying a medium to the second transfer position of the recording medium 9 is executed in the medium supply unit 8 which is also part of the image forming unit 6. In this process, in the exposure operation, exposure of image components is performed based on the information on the object to be read 95 read by the reading device 1A or the reading device 1B.

Thus, in the image forming apparatus 5, a toner image of a predetermined color is formed on each drum-shaped photoreceptor 61 of the imaging units 60A, 60B, 60C, 60D. Also, in the image forming apparatus 5, after a toner image of each color is first transferred to the drum-shaped intermediate transfer body 71 in the intermediate transfer unit 70, the toner image is superimposedly second transferred to the recording medium 9 supplied to the second transfer position through the transport path 85.

Subsequently, in the fixing device 78 of the image forming apparatus 5, a fixing operation is performed in which the recording medium 9 with a toner image second transferred is guided and passed through the fixing nip part where the rotating body for heating and the rotating body for pressure come into contact with each other.

Consequently, in the image forming apparatus 5, an unfixed toner image is heated under pressure, and fixed onto the recording medium 9. The recording medium 9 after fixing is discharged to and stored in the discharge storage 51 through the transport path 85.

A basic operation of forming a multicolor image on one side of a recording medium 9 by the image forming apparatus 5 is completed by the above-described operation.

In the image forming apparatus 5, the height h1 of the housing 10A for the reading device 1A or the height h2 of the housing 10B for the reading device 1B is reduced, as compared to an image forming apparatus to which the reading device 1X (see FIG. 10) of the comparative example is applied, in which the motor 40 is disposed so as not to overlap with the reading unit 20 along the upward and downward directions inside the housing for the reading device.

As a result, in the image forming apparatus 5, the height h5 of the entire apparatus is similarly reduced by the amount by which the height h1 of the housing 10A for the reading device 1A or the height h2 of the housing 10B for the reading device 1B is reduced.

Modifications

Although the exemplary embodiments of the present disclosure have been described above, the present disclosure is not limited to the configuration exemplified in Exemplary Embodiments 1 to 3, and various modifications and implementations are possible in a range without departing from the gist of the present disclosure. Thus, the present disclosure also includes, for example, the modifications shown below.

In the reading device 1A or the reading device 1B, the motor 40 or the power transmission unit 35 may provide power to the second pulley 34A in the movement unit 30 to drive the second pulley 34A.

In addition, in the reading device 1A or the reading device 1B, when the motor 40 is disposed outward of the scan area SA of the reading unit 20 or the area TA where the back-and-forth movement is made, the motor 40 is not necessarily disposed in an area rearward of the scan area SA or the area TA where the back-and-forth movement is made, and may be disposed, for example, in an area forward of the scan area SA or the area TA where the back-and-forth movement is made.

Furthermore, in the reading device 1A or the reading device 1B, the second transparent flat plate 12 and the automatic document transport device 15 may not be disposed.

The image forming apparatus 5 exemplified in Exemplary Embodiment 3 is not limited to an image forming apparatus that forms a multicolor image, and may be an image forming apparatus that forms a monochrome image of a single color (for example, black).

In the image forming apparatus 5, the image forming unit 6 is not limited to an electrophotographic image forming unit 6 that forms, as an image composed of toner, information on the object to be read 95 read by the reading device 1A or the reading device 1B onto a recording medium 9, and an image forming unit 6 adopting an image forming system other than the electrophotographic system may be used. The image forming system other than the electrophotographic system includes, for example, a liquid droplet ejection method, a heat-sensitive method, and a printing method.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

A reading device comprising:

a housing including a transparent flat plate on an upper surface on which an object to be read is placed;

a reading unit that reads information on the object to be read by coming into contact with a lower surface of the transparent flat plate inside the housing;

a movement unit that causes the reading unit to move back and forth within a scan area inside the housing; and a motor that provides power to the movement unit inside the housing, wherein the motor is disposed to overlap with the reading unit along upward and downward directions inside the housing.

(((2)))

The reading device according to (((1))), wherein the movement unit is disposed below the reading unit, and the motor and the reading unit are disposed in a same area with respect to the movement unit as a border in upward and downward directions inside the housing.

(((3)))

The reading device according to (((1))) or (((2))), wherein the motor is disposed outward of the scan area inside the housing.

(((4)))

The reading device according to any one of (((1))) to (((3))), wherein the motor is disposed outward of an area where the reading unit moves back and forth inside the housing.

(((5)))

The reading device according to any one of (((1))) to (((4))), wherein the movement unit is constituted by a guide unit that supports and guides the reading unit along a direction in which the reading unit moves back and forth; a movement member that is fixed to part of the reading unit, disposed along the guide unit, and moves; and a rotary holder that rotates while movably holding the movement member, and a drive shaft of the motor is directly connected to the rotary holder.

(((6)))

The reading device according to any one of (((1))) to (((4))), wherein the movement unit is constituted by a guide unit that supports and guides the reading unit along a direction in which the reading unit moves back and forth; a movement member that is fixed to part of the reading unit, disposed along the guide unit, and moves; and a rotary holder that rotates while movably holding the movement member, and a drive shaft of the motor is coupled to a power transmission unit that relays and transmits power to the rotary holder.

(((7)))

An image forming apparatus comprising:

the reading device according to any one of (((1))) to (((6))); and an image forming unit that forms information read by the reading device as an image on a recording medium.

What is claimed is:

1. A reading device comprising:

a housing including a transparent flat plate on an upper surface on which an object to be read is placed;

a reading unit that reads information on the object to be read by coming into contact with a lower surface of the transparent flat plate inside the housing;

a movement unit that causes the reading unit to move back and forth within a scan area inside the housing; and a motor that provides power to the movement unit inside the housing, wherein the motor is disposed to overlap with the reading unit along upward and downward directions inside the housing, a most bottom surface of the motor and a most bottom surface of the reading unit are aligned in the same axis in a direction of movement of the reading unit, and the motor and the reading unit are configured to remain on the same axis as the reading unit moves.

2. The reading device according to claim 1,
wherein the movement unit is disposed below the reading unit, and
the motor and the reading unit are disposed in a same area with respect to the movement unit as a border in upward and downward directions inside the housing.

3. The reading device according to claim 1,
wherein the motor is disposed outward of the scan area inside the housing.

4. The reading device according to claim 1,
wherein the motor is disposed outward of an area where the reading unit moves back and forth inside the housing.

5. The reading device according to claim 1,
wherein the movement unit is constituted by a guide unit that supports and guides the reading unit along a direction in which the reading unit moves back and forth; a movement member that is fixed to part of the reading unit, disposed along the guide unit, and moves; and a rotary holder that rotates while movably holding the movement member, and
a drive shaft of the motor is directly connected to the rotary holder.

6. The reading device according to claim 1,
wherein the movement unit is constituted by a guide unit that supports and guides the reading unit along a direction in which the reading unit moves back and forth; a movement member that is fixed to part of the reading unit, disposed along the guide unit, and moves; and a rotary holder that rotates while movably holding the movement member, and
a drive shaft of the motor is coupled to a power transmission unit that relays and transmits power to the rotary holder.

7. An image forming apparatus comprising:
the reading device according to claim 1; and
an image forming unit that forms information read by the reading device as an image on a recording medium.

8. An image forming apparatus comprising:
the reading device according to claim 2; and
an image forming unit that forms information read by the reading device as an image on a recording medium.

9. An image forming apparatus comprising:
the reading device according to claim 3; and
an image forming unit that forms information read by the reading device as an image on a recording medium.

10. An image forming apparatus comprising:
the reading device according to claim 4; and
an image forming unit that forms information read by the reading device as an image on a recording medium.

11. An image forming apparatus comprising:
the reading device according to claim 5; and
an image forming unit that forms information read by the reading device as an image on a recording medium.

12. An image forming apparatus comprising:
the reading device according to claim 6; and
an image forming unit that forms information read by the reading device as an image on a recording medium.

13. A reading device comprising:
means for including a transparent flat plate on an upper surface on which an object to be read is placed;
means for reading information on the object to be read by coming into contact with a lower surface of the transparent flat plate inside the means for including the transparent flat plate;
means for causing the means for reading information to move back and forth within a scan area inside the means for including the transparent flat plate; and
means for providing power to the means for causing the means for reading information to move inside the means for including the transparent flat plate,
wherein the means for providing power is disposed to overlap with the means for reading information along upward and downward directions inside the means for including the transparent flat plate,
a most bottom surface of the means for providing power and a most bottom surface of the means for reading information are aligned in the same axis in a direction of movement of the means for reading information, and
the means for providing power and the means for reading information are configured to remain on the same axis as the means for reading information moves.

* * * * *